(12) United States Patent
Tiwari (10) Patent No.: US 11,314,212 B2
(45) Date of Patent: Apr. 26, 2022

(54) HTM-BASED PREDICTIONS FOR SYSTEM BEHAVIOR MANAGEMENT

(71) Applicant: Kyndryl, Inc., New York, NY (US)

(72) Inventor: Awadesh Tiwari, Bangalore (IN)

(73) Assignee: KYNDRYL, INC., New York, NY (US)

( * ) Notice: Subject to any disclaimer, the term of this patent is extended or adjusted under 35 U.S.C. 154(b) by 157 days.

(21) Appl. No.: 16/773,264

(22) Filed: Jan. 27, 2020

(65) Prior Publication Data

US 2021/0232105 A1    Jul. 29, 2021

(51) Int. Cl.
*G05B 13/04* (2006.01)
*G05B 23/02* (2006.01)

(52) U.S. Cl.
CPC ....... *G05B 13/048* (2013.01); *G05B 23/0224* (2013.01)

(58) Field of Classification Search
None
See application file for complete search history.

(56) References Cited

U.S. PATENT DOCUMENTS

| 7,430,546 | B1 * | 9/2008 | Suri ................... | G06N 3/08 |
| | | | | 706/16 |
| 9,159,021 | B2 | 10/2015 | Hawkins et al. | |
| 2007/0244575 | A1 * | 10/2007 | Wojsznis ............ | G05B 17/02 |
| | | | | 700/38 |
| 2011/0231351 | A1 * | 9/2011 | George ................ | G06N 3/049 |
| | | | | 706/12 |
| 2015/0254554 | A1 * | 9/2015 | Kato ................... | G06N 3/084 |
| | | | | 706/21 |

(Continued)

FOREIGN PATENT DOCUMENTS

| CN | 104698843 B | 7/2017 |
| WO | 2012162332 A1 | 11/2012 |

OTHER PUBLICATIONS

Maasoumy et al., Handling model uncertainty in model predictive control for energy efficient buildings, Energy and Buildings 77, Jul. 2014, pp. 377-392, https://www.researchgate.net/publication/261801572.

*Primary Examiner* — Mohammad Ali
*Assistant Examiner* — David Earl Ogg
(74) *Attorney, Agent, or Firm* — Garg Law Firm, PLLC; Rakesh Garg; Erik Swanson (57) ABSTRACT

An embodiment includes duplicating an input dataset being input to a model predictive control (MPC) module for input to a first Hierarchical Temporal Memory (HTM) network. The embodiment also includes generating system behavior data using the MPC module for characteristic data of the input dataset. The embodiment also includes generating first HTM prediction data from the input dataset and the system behavior data using the first HTM network, the first HTM prediction data comprising predictions for respective dimensions of the system. The embodiment also includes generating second HTM prediction data from the first HTM prediction data and system output data using a second HTM network, the second HTM prediction data comprising a distinction between the first HTM prediction and the system output data. Finally, the embodiment includes determining that the distinction of the second HTM prediction data indicates an anomaly and adjusting system input data based on the anomaly.

20 Claims, 5 Drawing Sheets

(56) References Cited

U.S. PATENT DOCUMENTS

| | | | |
|---|---|---|---|
| 2017/0364043 A1 | 12/2017 | Ganti et al. | |
| 2019/0041811 A1* | 2/2019 | Drees | G06N 3/08 |
| 2019/0149565 A1* | 5/2019 | Hagi | G06N 20/00 |
| | | | 726/23 |
| 2019/0197390 A1* | 6/2019 | Imaino | G06N 3/082 |
| 2020/0201313 A1* | 6/2020 | Kludt | G06N 3/082 |
| 2021/0165375 A1* | 6/2021 | Zhao | G05B 13/027 |

\* cited by examiner

HTM-BASED PREDICTIONS FOR SYSTEM BEHAVIOR MANAGEMENT

TECHNICAL FIELD

The present invention relates generally to a method, system, and computer program product for system control and management. More particularly, the present invention relates to a method, system, and computer program product for HTM-based predictions for system behavior management.

BACKGROUND

A Building Automation System (BAS) is a computer-based control system installed in a building that controls the building's mechanical and electrical equipment, primarily heating, ventilating, and air conditioning (HVAC) systems, but can also be used to control other systems. A typical BAS receives input data from an input data system (sensors, meters) and from external systems (i.e., a building HVAC controller or fault detection tool). The typical functioning of a BAS involves processing the input data and providing control signals to one or more other devices (e.g., building HVAC controller or FDD (Fault Detection and Diagnosis)) so that the building mechanical systems operate according to desired parameters. For example, a simple example of a BAS is a thermostat that monitors the temperature of an interior space and controls an HVAC system to heat or cool the interior space towards a desired set point. A more sophisticated BAS controls multiple mechanical systems of a building, including lighting, plumbing, elevators, escalators, and heating and air-conditioning systems where the BAS controls such things as blowers, compressors, water chillers, boilers, pumps, and generators.

Effective control of building mechanical systems is desirable for several reasons, such as energy efficiency, system uptime, and safety. Depending on factors such as the building size and system complexity, the way in which a BAS controls a system can directly affect the energy used by operation of the system. System uptime refers to the amount of time a system is up or operational, as opposed to when the system is down or non-operational, whether it be planned or unplanned down time. Effective system monitoring and control, including planning downtime for preventive maintenance, can reduce unplanned downtime. In addition, effective control by a BAS can help to make sure that the health and well-being of building occupants are protected.

SUMMARY

The illustrative embodiments provide for htm-based predictions for system behavior management. An embodiment includes duplicating an input dataset being input to a model predictive control (MPC) module for input to a first Hierarchical Temporal Memory (HTM) network, the input dataset being associated with a system, the input dataset including first system input data that is input to the system, the input dataset including data associated with a plurality of dimensions of the system, and the input dataset including a characteristic dataset representative of a characteristic of the system. The embodiment also includes generating system behavior data representative of a system behavior curve using the MPC module for the characteristic datasets. The embodiment also includes generating first HTM prediction data from the input dataset and the system behavior data using the first HTM network comprising a plurality of regions each having a plurality of active and inactive nodes, the first HTM prediction data comprising predictions for respective dimensions of the system based on the active nodes for respective regions of the first HTM network. The embodiment also includes generating second HTM prediction data from the first HTM prediction data and system output data using a second HTM network comprising a plurality of regions each having a plurality of active and inactive nodes, the second HTM prediction data comprising a distinction between the first HTM prediction and the system output data based on the active nodes for respective regions of the second HTM network. The embodiment also includes determining that the distinction of the second HTM prediction data indicates an anomaly. The embodiment also includes adjusting second system input data that is input to the system based on the anomaly. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

As buildings and their mechanical and electrical equipment become more complex, it becomes increasingly difficult for existing BAS to effectively monitor and control such systems. Some BAS include an optimization strategy for feedback control called Model Predictive Control (MPC). MPC is a flexible procedure that runs a set of forecasts for a system model forward in time to try to find a best next control action for approaching a desired objective. A selected control action is applied to the controlled system, and the process then reinitializes for a next window of time, or horizon, where it repeats the forecasting and optimizing over the next short time period, and continues in this manner forward in time for each short time period. Ideally this process results in a series of steps in the system operation that approach and eventually achieve a desired set point. However, MPC is limited in that it is a finite domain controller that generates only a one-dimensional curve (i.e., one dimension over time) as an indication of system behavior.

The illustrative embodiments recognize that combining a suitable artificial intelligence (AI) technology with an MPC extends the finite MPC domain problem into an infinite domain controller. The resulting controller would therefore not be limited to forecasting a single time step ahead, but instead can forecast multiple time steps ahead. Also, the resulting controller can create a multi-dimensional characterization curve (i.e., a plurality of dimensions over time), allowing for a more complete indication of the current state of the controlled system.

Artificial intelligence (AI) technology has evolved significantly over the past few years. Modern AI systems are achieving human level performance on cognitive tasks like converting speech to text, recognizing objects and images, or translating between different languages. This evolution holds promise for new and improved applications in many industries.

Neuromorphic and synaptronic computation systems, also referred to as Artificial Neural Networks (ANNs), are computational systems that permit electronic systems to function in a manner analogous to that of biological brains. An ANN is made up of several simple, highly interconnected processing elements (nodes) that process information by their dynamic state response to external inputs. ANNs are processing devices (algorithms and/or hardware) that are loosely modeled after the neuronal structure of the mammalian cerebral cortex but on much smaller scales. A large ANN might have hundreds or thousands of processor units, whereas a mammalian brain has billions of neurons with a corresponding increase in magnitude of their overall interaction and emergent behavior.

The illustrative embodiments also recognize that many types of ANNs would be unsuitable for combining with an MPC to achieve an improved controller that is an infinite-domain, multi-dimensional controller. For example, many types of ANNs require a huge amount of historical data for training and fail if there is not any historical data available, or no relations among variables exist, which is the case in a typical MPC controller scenario. Also, many types of ANNs are unsuitable because they require a label, and labels are not readily available in an MPC control system environment.

However, the term "artificial neural network" can refer to many different types of networks. A Hierarchical Temporal Memory (HTM) is one example of an ANN, although an HTM is different from most other types of ANNs. HTMs can learn time-based patterns on an ongoing continuous basis for unlabeled data rather than relying on large amounts of historic data. In an HTM network, training data may comprise temporal sequences of patterns presented to a network of nodes. The HTM network may then build a model of the statistical structure associated with the patterns and sequences in the training data, and thereby learn to predict future patterns and sequences in the training data. The hierarchical structures of the HTM network facilitates building models of very high dimensional input spaces.

Thus, the illustrative embodiments also recognize that combining an HTM with an MPC extends the finite MPC domain problem into an infinite domain controller. The resulting controller would therefore not be limited to forecasting a single time step ahead, but instead can forecast multiple time steps ahead. Also, the resulting controller can create a multi-dimensional characterization curve (i.e., a plurality of dimensions over time), allowing for a more complete indication of the current state of the controlled system.

In some embodiments, an HTM network exhibits characteristics like the neocortex of the human brain. For example, in some embodiments, an HTM network is represented as a tree-shaped hierarchy having multiple levels. In some embodiments, data is input into the lower levels, and the output from lower levels is used as input for higher levels. In some embodiments, each level comprises one or more regions. In some embodiments, lower levels can comprise more regions than higher levels. In some embodiments, each region comprises a plurality of nodes (e.g., a region of a level can be a 16×16 square of nodes). In some embodiments, each node comprises a column of cells (e.g., each node can comprise a column of three cells). In some embodiments, HTM networks learn based on patterns of active cells (or patterns of active nodes). In some embodiments, an individual cell is activated by a feed forward input (e.g., an input received from a lower level) or by an adjacent input (e.g., input received from a cell on the same level).

In some embodiments, the HTM network uses one or more spatial poolers to format data and one or more temporal poolers to predict a next pattern of active cells and/or nodes. In some embodiments, a spatial pooler is configured to convert received data into a format suitable for an HTM network. For example, in some embodiments, a spatial pooler reformats the data to a size suitable to the number of levels, regions, and/or nodes of an HTM network. As another example, in some embodiments, a spatial pooler reformats data to at least one different data structure exhibiting increased information efficiency. For example, in some embodiments, a spatial pooler generates one or more sparse distributed representations (SDR) of input data. In such an example, the SDR is input to a region of the HTM network by activating a set of cells in a respective region of the HTM network based on the SDR of the input data.

In some embodiments, a temporal pooler is configured to predict a next received input (e.g., a next set of active cells or active nodes). In some embodiments, a temporal pooler makes continuous predictions for each region of each level of an HTM network. In some embodiments, an HTM network learns based on observing patterns associated with correct predictions and patterns associated with incorrect predictions over time. In some embodiments, an application identifies anomalous behavior based on the temporal pooler making one or more incorrect predictions. In some embodiments, an incorrect prediction implies abnormal behavior of the input data. In some embodiments, an application identifies anomalous behavior based on the temporal pooler making one or more predictions suggestive of anomalous behavior (e.g., predictions matching a known anomalous pattern).

In some embodiments, an application identifies, or receives input data from various sources that includes temporal data about a system. In some embodiments, an application runs an MPC optimization procedure over the input data to try to find the best control signal u over some window of time, or time horizon, that gets the system parameters closer to a desired objective. In some embodiments, the control signal u and a duplicate of the input data are input to an HTM plant module. In some embodiments, the HTM plant semantically encodes the inputs as a sparse array called a sparse distributed representation (SDR). In some embodiments, the encoded sparse array goes through a processing called spatial pooling to normalize the input data from the various sources into a sparse output vector. In some embodiments, the learning of this spatial pooling is done through Hebbian learning with boosting of prolonged inactive cells. In some embodiments, the spatial pooling retains the context of the input data by an algorithm called temporal memory.

In some embodiments, an SDR is an array of 0's and 1's modelled after neurons in the mammalian brain in which less than 2% of neurons are active at any given moment. An SDR is very resistant to noise in a signal or in data. Also, an SDR can be sub-sampled without losing much information. As a non-limiting example, in some embodiments, an SDR has one hundred 1's and fifty thousand 0's, and if twenty-five of the 0's are removed from the SDR, the HTM plant can still use the sub-sampled SDR to match with new SDR's.

In some embodiments, an application receives an input dataset from various sources. In some embodiments, the application generates HTM prediction data from the input dataset and system behavior data using an HTM network comprising a plurality of regions each having a plurality of active and inactive nodes. In some embodiments, the HTM prediction data comprises predictions for respective dimensions of the system based on the active nodes for respective regions of the HTM network. In some embodiments, the application uses the HTM prediction data to detect an anomaly and adjust system input data based on the anomaly.

In some embodiments, an application receives an input dataset from various sources. In some embodiments, the application generates HTM prediction data from prediction data and system output data using an HTM network comprising a plurality of regions each having a plurality of active and inactive nodes. In some embodiments, the HTM prediction data comprises a distinction between the prediction data and the system output data based on the active nodes for respective regions of the HTM network. In some embodiments, the application uses the HTM prediction data to detect an anomaly and adjust system input data based on the anomaly.

In some embodiments, an application receives an input dataset from various sources. In some embodiments, the application generates first HTM prediction data from the input dataset and system behavior data using a first HTM network comprising a plurality of regions each having a plurality of active and inactive nodes. In some embodiments, the first HTM prediction data comprises predictions for respective dimensions of the system based on the active nodes for respective regions of the first HTM network. In some embodiments, the application generates second HTM prediction data from the first HTM prediction data and system output data using a second HTM network comprising a plurality of regions each having a plurality of active and inactive nodes. In some embodiments, the second HTM prediction data comprises a distinction between the prediction data and the system output data based on the active nodes for respective regions of the second HTM network. In some embodiments, the application uses the second HTM prediction data to detect an anomaly and adjust system input data based on the anomaly.

In some embodiments, an application receives an input dataset from various sources. In some embodiments, the application generates system behavior data representative of a system behavior curve using the MPC module for the characteristic datasets. In some embodiments, the application generates HTM prediction data from the input dataset and the system behavior curve using an HTM network comprising a plurality of regions each having a plurality of active and inactive nodes. In some embodiments, the HTM prediction data comprises predictions for respective dimensions of the system based on the active nodes for respective regions of the HTM network. In some embodiments, the application uses the HTM prediction data to detect an anomaly and adjust system input data based on the anomaly.

In some embodiments, an application receives an input dataset from various sources. In some embodiments, the application generates system behavior data representative of a system behavior curve using the MPC module for the characteristic datasets. In some embodiments, the application generates prediction data from the input dataset and the system behavior curve. In some embodiments, the application generates HTM prediction data from prediction data and system output data using an HTM network comprising a plurality of regions each having a plurality of active and inactive nodes. In some embodiments, the HTM prediction data comprises a distinction between the prediction data and the system output data based on the active nodes for respective regions of the HTM network. In some embodiments, the application uses the HTM prediction data to detect an anomaly and adjust system input data based on the anomaly.

In some embodiments, an application receives an input dataset from various sources. In some embodiments, the application generates system behavior data representative of a system behavior curve using the MPC module for the characteristic datasets. In some embodiments, the application generates first HTM prediction data from the input dataset and the system behavior curve using a first HTM network comprising a plurality of regions each having a plurality of active and inactive nodes. In some embodiments, the first HTM prediction data comprises predictions for respective dimensions of the system based on the active nodes for respective regions of the first HTM network. In some embodiments, the application generates second HTM prediction data from the first HTM prediction data and system output data using a second HTM network comprising a plurality of regions each having a plurality of active and inactive nodes. In some embodiments, the second HTM prediction data comprises a distinction between the prediction data and the system output data based on the active nodes for respective regions of the second HTM network. In some embodiments, the application uses the second HTM prediction data to detect an anomaly and adjust system input data based on the anomaly.

In some embodiments, an application receives an input dataset from various sources. In some embodiments, the application generates sparse distributed representations of the input dataset and system behavior data, and then generates HTM prediction data from the sparse distributed representations of the input dataset and system behavior data using an HTM network comprising a plurality of regions each having a plurality of active and inactive nodes. In some embodiments, the HTM prediction data comprises predictions for respective dimensions of the system based on the active nodes for respective regions of the HTM network. In some embodiments, the application uses the HTM prediction data to detect an anomaly and adjust system input data based on the anomaly.

In some embodiments, an application receives an input dataset from various sources. In some embodiments, the application generates sparse distributed representations of prediction data and system output data, and then generates HTM prediction data from the sparse distributed representations of the prediction data and system output data using an HTM network comprising a plurality of regions each having a plurality of active and inactive nodes. In some embodiments, the HTM prediction data comprises a distinction between the prediction data and the system output data based on the active nodes for respective regions of the HTM network. In some embodiments, the application uses the HTM prediction data to detect an anomaly and adjust system input data based on the anomaly.

In some embodiments, an application receives an input dataset from various sources. In some embodiments, the application applies a cortical learning algorithm to sparse distributed representations of the input dataset and system behavior data, and then generates HTM prediction data from the sparse distributed representations of the input dataset and system behavior data using an HTM network comprising a plurality of regions each having a plurality of active and inactive nodes. In some embodiments, the HTM prediction data comprises predictions for respective dimensions of the system based on the active nodes for respective regions of the HTM network. In some embodiments, the application uses the HTM prediction data to detect an anomaly and adjust system input data based on the anomaly.

In some embodiments, an application receives an input dataset from various sources. In some embodiments, the application applies a cortical learning algorithm to sparse distributed representations of prediction data and system output data, and then generates HTM prediction data from the sparse distributed representations of prediction data and system output data using an HTM network comprising a plurality of regions each having a plurality of active and inactive nodes. In some embodiments, the HTM prediction data comprises a distinction between the prediction data and the system output data based on the active nodes for respective regions of the HTM network. In some embodiments, the application uses the HTM prediction data to detect an anomaly and adjust system input data based on the anomaly.

In some embodiments, an application receives an input dataset from various sources. In some embodiments, the application generates system behavior data representative of a system behavior curve using the MPC module for the characteristic datasets. In some embodiments, the application generates sparse distributed representations of the input dataset and system behavior curve, and then generates first HTM prediction data from the sparse distributed representations of the input dataset and the system behavior curve using a first HTM network comprising a plurality of regions each having a plurality of active and inactive nodes. In some embodiments, the first HTM prediction data comprises predictions for respective dimensions of the system based on the active nodes for respective regions of the first HTM network. In some embodiments, the application generates sparse distributed representations of the prediction data and system output data, and then generates second HTM prediction data from the sparse distributed representations of the first HTM prediction data and system output data using a second HTM network comprising a plurality of regions each having a plurality of active and inactive nodes. In some embodiments, the second HTM prediction data comprises a distinction between the prediction data and the system output data based on the active nodes for respective regions of the second HTM network. In some embodiments, the application uses the second HTM prediction data to detect an anomaly and adjust system input data based on the anomaly.

In some embodiments, an application receives an input dataset from various sources. In some embodiments, the application generates system behavior data representative of a system behavior curve using the MPC module for the characteristic datasets. In some embodiments, the application applies a cortical learning algorithm to sparse distributed representations of the input dataset and system behavior data, and then generates first HTM prediction data from the input dataset and the system behavior curve using a first HTM network comprising a plurality of regions each having a plurality of active and inactive nodes. In some embodiments, the first HTM prediction data comprises predictions for respective dimensions of the system based on the active nodes for respective regions of the first HTM network. In some embodiments, the application applies a cortical learning algorithm to sparse distributed representations of the first HTM prediction data and system output data, and then generates second HTM prediction data from the first HTM prediction data and system output data using a second HTM network comprising a plurality of regions each having a plurality of active and inactive nodes. In some embodiments, the second HTM prediction data comprises a distinction between the prediction data and the system output data based on the active nodes for respective regions of the second HTM network. In some embodiments, the application uses the second HTM prediction data to detect an anomaly and adjust system input data based on the anomaly.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example.

Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, an illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, an illustrative embodiment may have some, all, or none of the advantages listed above.

Figure 1:
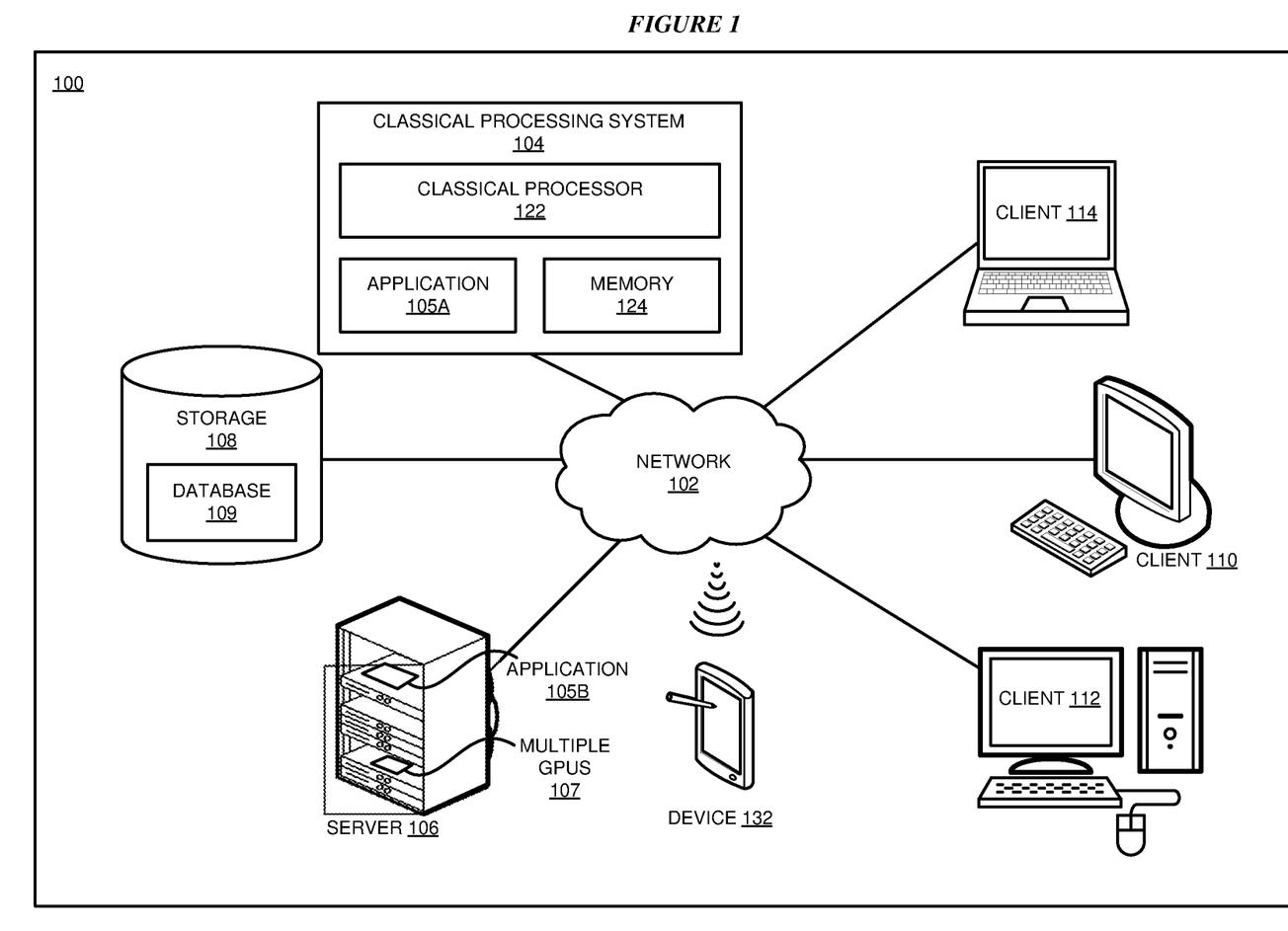
FIG. 1 depicts a block diagram of a network of data processing systems in which illustrative embodiments may be implemented.
Figure 2:
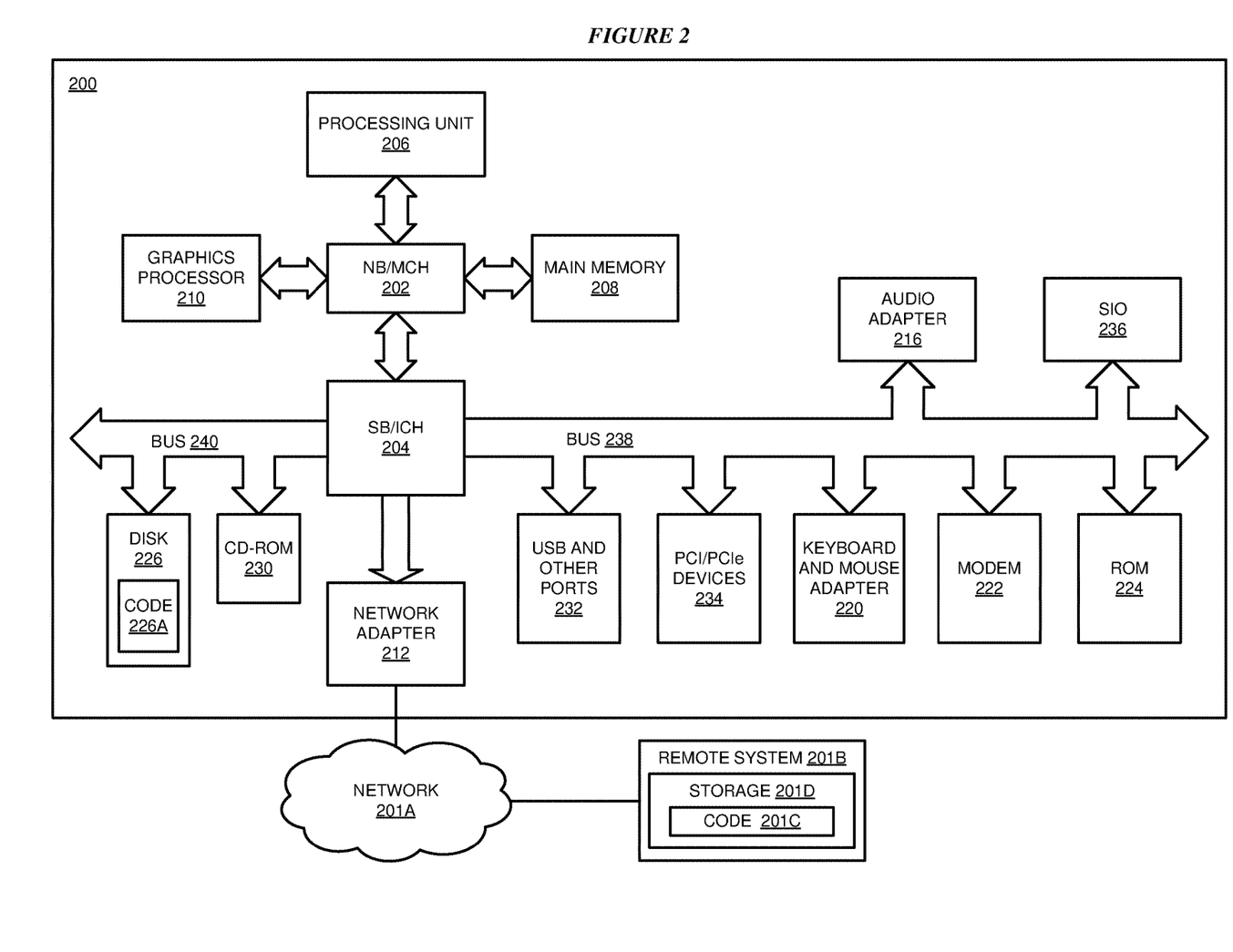
FIG. 2 depicts a block diagram of a data processing system in which illustrative embodiments may be implemented.

With reference to the figures and with reference to FIGS. 1 and 2, these figures are example diagrams of data processing environments in which illustrative embodiments may be implemented. FIGS. 1 and 2 are only examples and are not intended to assert or imply any limitation regarding the environments in which different embodiments may be implemented. An implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Data processing system 104 couples to network 102. Software applications may execute on any data processing system in data processing environment 100. Any software application described as executing in processing system 104 in FIG. 1 can be configured to execute in another data processing system in a similar manner. Any data or information stored or produced in data processing system 104 in FIG. 1 can be configured to be stored or produced in another data processing system in a similar manner. A data processing system, such as data processing system 104, may contain data and may have software applications or software tools executing computing processes thereon. In an embodiment, data processing system 104 includes memory 124, which includes application 105A that may be configured to implement one or more of the data processor functions described herein in accordance with one or more embodiments.

Server 106 couples to network 102 along with storage unit 108. Storage unit 108 includes a database 109 configured to store data as described herein with respect to various embodiments, for example image data and attribute data. Server 106 is a conventional data processing system. In an embodiment, server 106 includes HTM application 105B that may be configured to implement one or more of the processor functions described herein in accordance with one or more embodiments.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. In an embodiment, device 132 sends requests to server 106 to perform one or more data processing tasks by HTM application 105B such as initiating processes described herein of the HTM. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, data processing system 104, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown.

In an embodiment, one or more of HTM application 105A of data processing system 104 and HTM application 105B of server 106 implements an embodiment of an HTM as described herein. In an embodiment, the HTM is implemented using one of network application 105A and network application 105B within a single server or processing system. In another embodiment, the HTM is implemented using both network application 105A and network application 105B within a single server or processing system. Server 106 includes multiple GPUs 107 including multiple nodes in which each node may include one or more GPUs as described herein.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as several different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as data processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
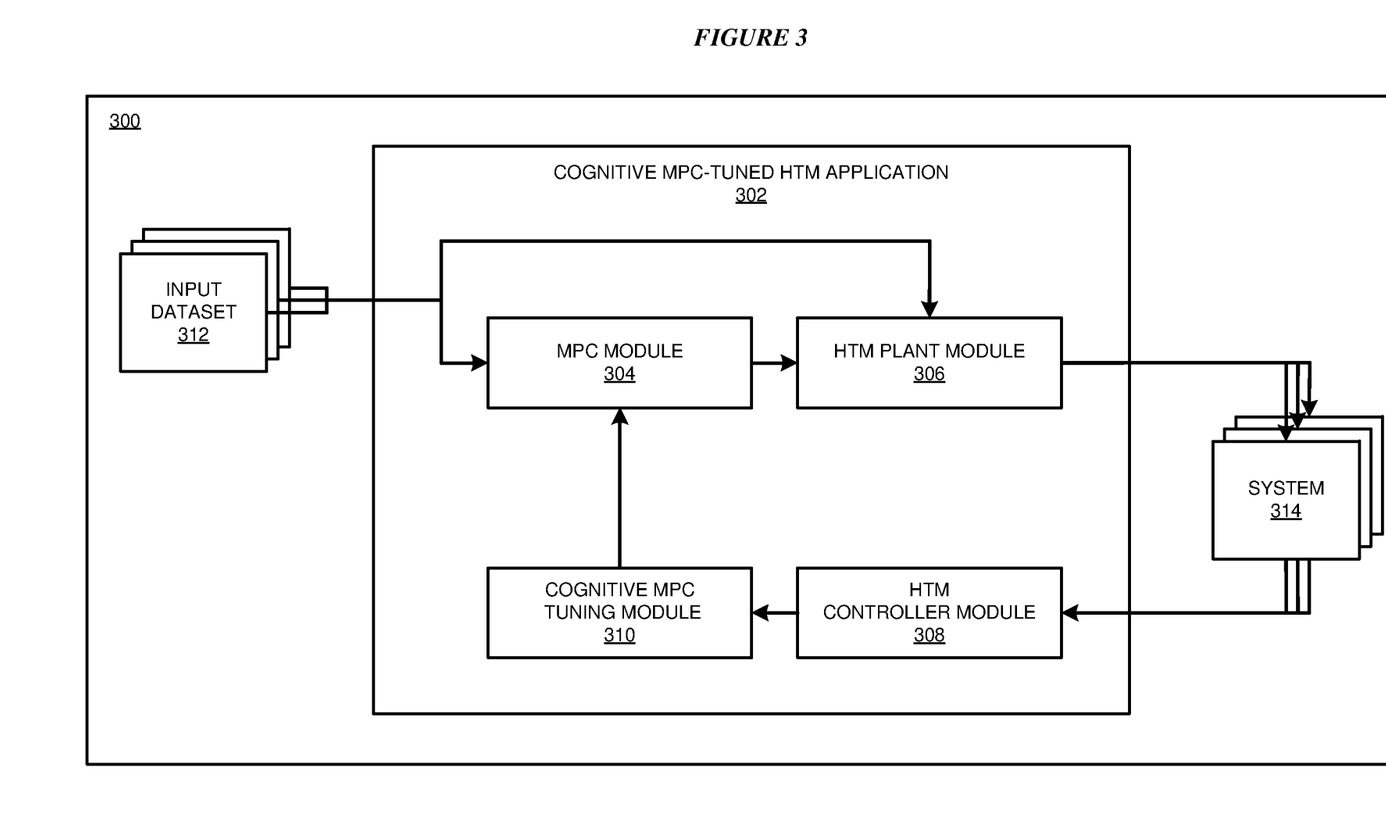
FIG. 3 depicts a block diagram of an example cognitive MPC-tuned HTM application in accordance with an illustrative embodiment.

With reference to FIG. 3, this figure depicts a block diagram of an example configuration 300 in accordance with an illustrative embodiment. The example embodiment includes a cognitive MPC-tuned HTM application 302. In an embodiment, application 302 is an example of application 105A/105B of FIG. 1.

In some embodiments, the cognitive MPC-tuned HTM application 302 includes an MPC module 304, an HTM plant module 306, an HTM controller module 308, and a cognitive MPC tuning module 310. In alternative embodiments, the cognitive MPC-tuned HTM application 302 includes some or all the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In some embodiments, the MPC module 304 is a predictive controller that receives one or more input datasets 312 associated with one or more respective systems 314. In some embodiments, the MPC module 304 is configured to determine an optimal setpoint for a parameter of a system 314 for each of a plurality of time steps during an optimization period. In some embodiments, the MPC module 304 is configured to determine an optimal setpoint for parameters of a plurality of respective systems 314 for each of a plurality of time steps during an optimization period. In some embodiments, the system 314 uses the parameter setpoints provided by the MPC module 304 to generate equipment commands for components of the system 314. In some embodiments, the MPC module 304 optimizes the objective function subject to a set of constraints. In some embodiments, the MPC module 304 automatically generates the optimization constraints by performing a system identification process and generating predictive models that describe the controlled system.

In some embodiments, the MPC module 304 includes elements for collecting data, training, and sending control signals. In some embodiments, the MPC module 304 sends control signals to one or more systems 314. For example, a signal is . . . its own logic for achieving a desired set point. Thus, in one or more embodiments, MPC module 304 includes software embodied on a non-transitory medium, executing on a computer processor and sending a set point out to the chiller, heater, etc.

In some embodiments, the MPC module 304 is implemented with a control system problems for solving the state of the system one time step ahead. However, in the illustrated embodiment, by combining the HTM plant module 306 and HTM controller module 308 with the MPC module 304, the application 302 becomes an infinite domain problem rather than a finite domain problem, so the application 302 can solve for multiple time steps ahead, and for multiple dimensions. For example, in some embodiments that include the MPC module 304 without the HTM modules 306 or 308, the MPC module 304 characterizes the system based on a single dimension over time, so for an industrial application like a model for a chiller measuring temperature, the MPC module 304 characterizes the system based on a rate of change of temperature over time or based on a falling rate of chiller temperature over time. In some embodiments, the application 302 includes the HTM modules 306 and 308 with the MPC module 304, and the MPC module 304 characterizes the system based a characterization curve in multiple dimensions, for example a characterization curve based on change of temperature over time, rate of system faults over time, availability of system over time, and failure rate over time, and it forms a multidimensional characterization curve, for any number of time periods for the system 314. The MPC module 304 generates system control signals for driving the system 314 according to the predicted characterization curve, and provides these signals to the HTM plant module 306 and to the actual system 314.

In the illustrated embodiment, the HTM plant module 306 mimics the system 314 behavior using a transfer function G(s) that the HTM plant module 306 creates. In some embodiments, the HTM plant module 306 creates the multidimensional transfer function by learning the normal behavior of each of the input parameters, not in an isolated manner, but in a coupled environment. As a non-limiting example, in an embodiment the input dataset dimensions include temperature, pressure, and flow, the HTM plant module 306 creates a relationship among the temperature, pressure, and flow, and creates a normal period of all these metrics into a single metric that is fed back to the MPC module 304.

The output of the simulation of the system 314 from the MPC plant module 306 is provided to the HTM controller module 312 along with the actual output from the system 314 from the same inputs used by the HTM plant module 306 to simulate the system 314. The HTM controller module 312 compares the output of the HTM plant module 306 to the output of the system 314 to look for anomalies. The HTM controller module 312 also predicts desired parameters associated with corrective action which has taken place to bring the system behavioral as intended is intended as a form of a set point using HTM and MPC together.

The parameters are output to the cognitive MPC tuning module 310. The parameters from the HTM controller 312 provide an indication of desired parameters to get the intended output, for example what the temperature rate, failure rate, and other outputs from the HTM controller module 312 should be. Then, the cognitive MPC tuning module 310, which is a multidimensional MPC, and which determines control signals for the system 314 to achieve the parameters received from the HTM controller module 312.

Figure 4:
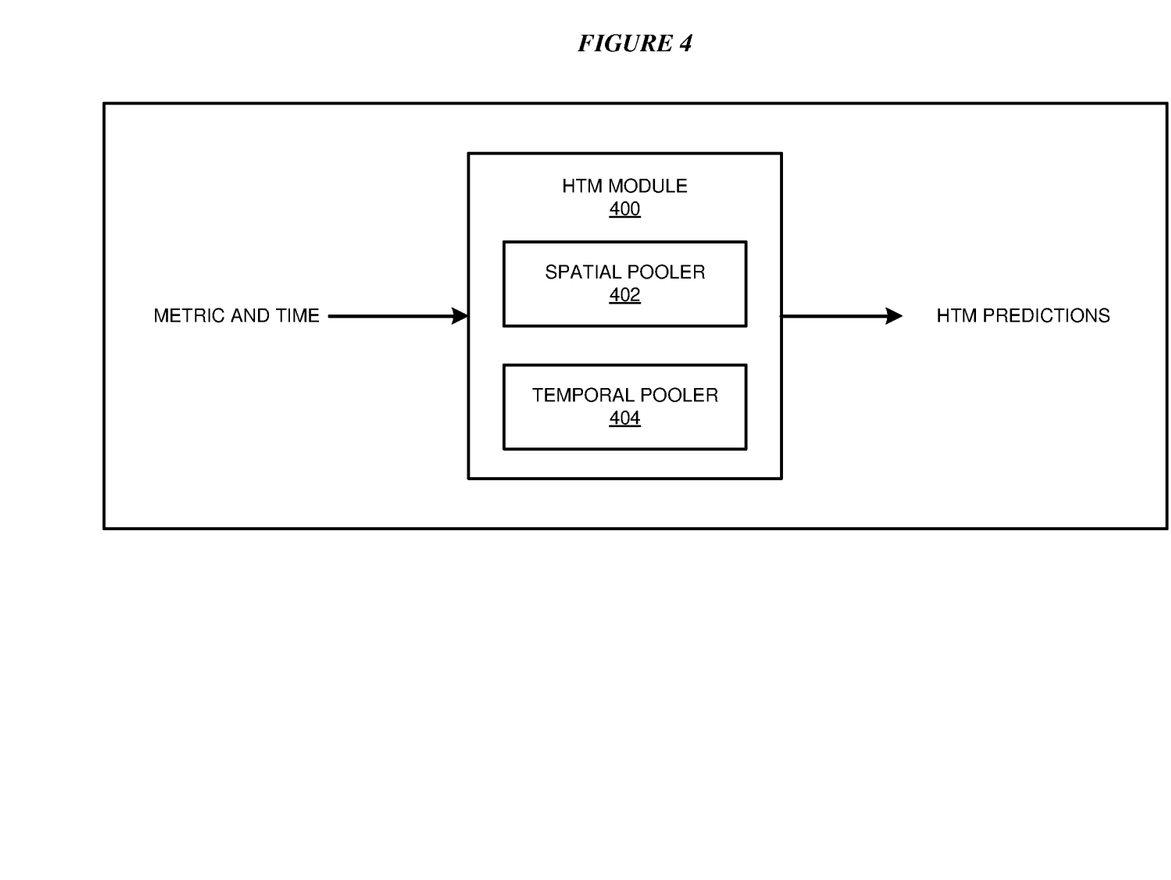
FIG. 4 depicts a block diagram of an example HTM module in accordance with an illustrative embodiment.

With reference to FIG. 4, this figure depicts a block diagram of an example HTM module 400 in accordance with an illustrative embodiment. In an embodiment, HTM module 400 is an example of HTM plant module 306 and HTM controller module 308 of FIG. 3.

In the illustrated embodiment, the HTM module 400 performs a technique for machine learning wherein the HTM module 400 exhibits characteristics like the neocortex of the human brain. In some embodiments, the HTM module 400 can be represented as a tree-shaped hierarchy having multiple levels. Metric and time data can be input into the lower levels, and the output from lower levels can be used as input for higher levels. Each level can comprise one or more regions. Lower levels can comprise more regions than higher levels. Each region can comprise a plurality of nodes (e.g., a region of a level can be a 16×16 square of nodes). Each node can comprise a column of cells (e.g., each node can comprise a column of three cells). In some embodiments, the HTM module 400 learns based on patterns of active cells (or patterns of active nodes), where an individual cell is activated by a feed forward input (e.g., an input received from a lower level) or by an adjacent input (e.g., input received from a cell on the same level).

In the illustrated embodiment, the HTM module 400 uses one or more spatial poolers 402 to format data and one or more temporal poolers 404 to predict a next pattern of active cells and/or nodes. In some embodiments, spatial pooler 402 is configured to convert the received data into a format suitable for the HTM module 400. For example, the spatial pooler 402 can reformat the data to a size suitable to the number of levels, regions, and/or nodes of The HTM module 400. As another example, spatial pooler 402 can reformat the data to at least one different data structure exhibiting increased information efficiency. For example, spatial pooler 402 can generate one or more sparse distributed representations (SDR) of the input data. In such an example, the SDR can be input to a region of the HTM module 400 by activating a set of cells in a respective region of the HTM module 400 based on the SDR of the input data. In alternative embodiments, the application 302 provides appropriately formatted data directly to the HTM module 400.

In the illustrated embodiment, the temporal pooler 404 is configured to predict a next received input (e.g., a next set of active cells or active nodes). In some embodiments, the temporal pooler 404 makes continuous predictions for each region of each level of the HTM module 400. In some embodiments, the HTM module 400 learns based on observing patterns associated with correct predictions and patterns associated with incorrect predictions over time. In some embodiments, the present disclosure identifies anomalous behavior based on the temporal pooler 404 making one or more incorrect predictions. In some embodiments, the incorrect prediction implies abnormal behavior of the input data. In alternative embodiments, the present disclosure identifies anomalous behavior based on temporal pooler 404 making one or more predictions suggestive of anomalous behavior (e.g., predictions matching a known anomalous pattern).

In some embodiments, the temporal pooler 404 comprises a Cortical Learning Algorithm (CLA). In some embodiments, the CLA is a simulation of a small slice of the neocortex, and is responsible for learning the patterns and sequences associated with the system 314. In some embodiments, when each new data point arrives, the CLA compares its prediction and level of confidence to the new input to see how correct its prediction was. As a result, in such embodiments, every new data point results in a scalar estimate of the accuracy of the previous prediction. In some embodiments, this value, known as the raw anomaly score, is then scaled according to its relative position in the normal distribution of aggregated anomaly scores recorded over a longer time period.

In some embodiments, the output of the HTM module 400 comprises an array representing active cells (or nodes) of a given region of the HTM module 400. In some embodiments, the output of the HTM module 400 comprises an array representing differences between a predicted pattern of active cells in a respective region of the HTM module 400 and an observed pattern of active cells in the respective region of the HTM module 400. In some embodiments, the output of the HTM module 400 comprises HTM predictions in the form of an array representing matches between a predicted pattern of active cells in a respective region of the HTM module 400 and a known anomalous pattern of active cells in the respective region of the HTM module 400.

Figure 5:
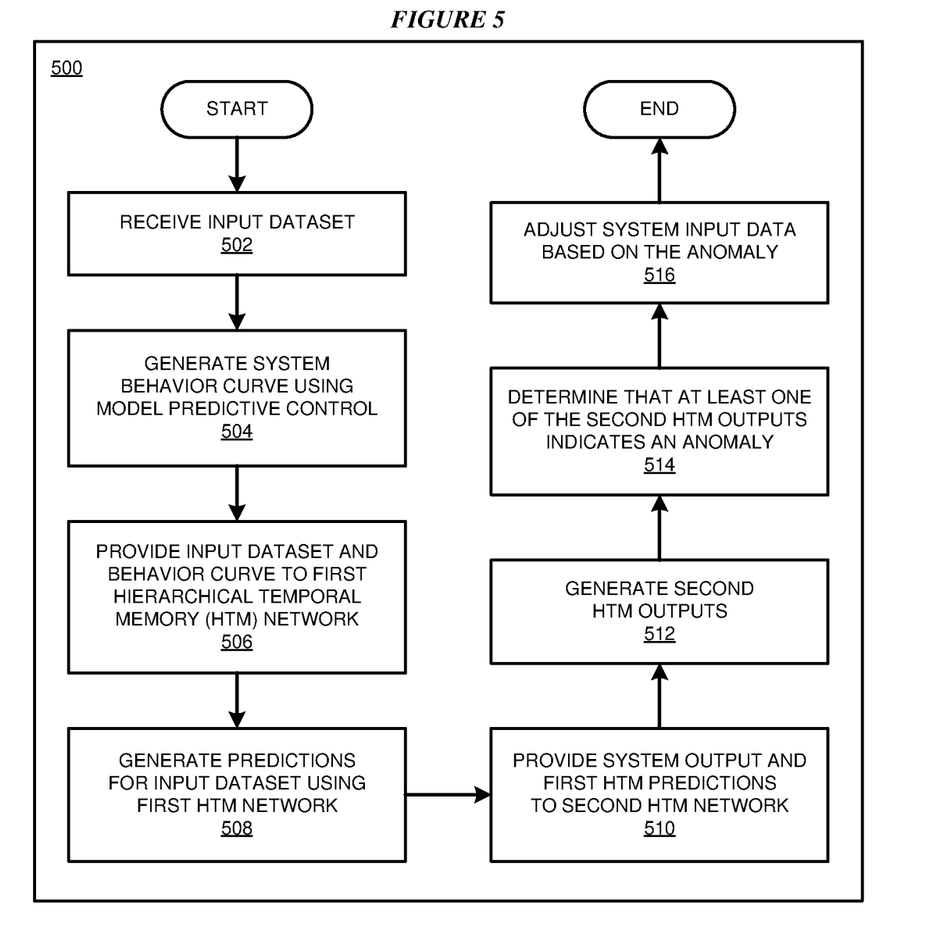
FIG. 5 depicts a flowchart of an example process for HTM-based predictions for system behavior management in accordance with an illustrative embodiment.

With reference to FIG. 5, this figure depicts a flowchart of an example process 500 for HTM-based predictions for system behavior management in accordance with an illustrative embodiment. In an embodiment, the cognitive MPC-tuned HTM application 302 carries out the process 500.

In an embodiment, at block 502, the process receives and duplicates an input dataset being input to a model predictive control (MPC) module for input to a first Hierarchical Temporal Memory (HTM) network. In some embodiments, the input dataset is associated with a system. In some embodiments, the input dataset includes first system input data that is input to the system. In some embodiments, the input dataset includes data associated with a plurality of dimensions of the system. In some embodiments, the input dataset includes a characteristic dataset representative of a characteristic of the system.

In the illustrated embodiment, at block 504, the process generates system behavior data representative of a system behavior curve using the MPC module for the characteristic datasets. In the illustrated embodiment, at block 506, the process provides the input dataset and behavior curve to a first HTM module that comprises a first HTM network. In the illustrated embodiment, at block 508, the process generates first HTM prediction data from the input dataset and the system behavior data using the first HTM network. In some embodiments, the first HTM network comprises a plurality of regions each having a plurality of active and inactive nodes. In some embodiments, the first HTM prediction data comprises predictions for respective dimensions of the system based on the active nodes for respective regions of the first HTM network.

In the illustrated embodiment, at block 510, the process provides system output and first HTM predictions to a second HTM module that comprises a second HTM network. In the illustrated embodiment, at block 512, the process generates second HTM prediction data from the first HTM prediction data and system output data using a second HTM network. In some embodiments, the second HTM network comprises a plurality of regions each having a plurality of active and inactive nodes. In some embodiments, the second HTM prediction data comprises a distinction between the first HTM prediction and the system output data based on the active nodes for respective regions of the second HTM network.

In the illustrated embodiment, at block 514, the process determines that the distinction of the second HTM prediction data indicates an anomaly. In the illustrated embodiment, at block 516, the process adjusts the second system input data that is input to the system based on the anomaly.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method comprising:
   duplicating an input dataset being input to a model predictive control (MPC) module for input, along with a control signal generated by the MPC for a system, to a first Hierarchical Temporal Memory (HTM) network that simulates the system, the input dataset being associated with a system, the input dataset including first system input data that is input to the system, the input dataset including data associated with a plurality of dimensions of the system, and the input dataset including a characteristic dataset representative of a characteristic of the system;

generating system behavior data representative of a system behavior curve using the MPC module for the characteristic datasets;

generating first HTM prediction data from the input dataset and the system behavior data using the first HTM network comprising a plurality of regions each having a plurality of active and inactive nodes, the first HTM prediction data comprising predictions for respective dimensions of the system based on the active nodes for respective regions of the first HTM network;

generating second HTM prediction data from the first HTM prediction data and system output data using a second HTM network comprising a plurality of regions each having a plurality of active and inactive nodes, the second HTM prediction data comprising a distinction between the first HTM prediction and the system output data based on the active nodes for respective regions of the second HTM network;

determining that the distinction of the second HTM prediction data indicates an anomaly; and adjusting second system input data that is input to the system based on the anomaly.

2. The computer implemented method of claim 1, wherein the generating of the first HTM prediction data comprises generating sparse distributed representations of the input dataset and system behavior data.

3. The computer implemented method of claim 1, wherein the generating of the second HTM prediction data comprises generating sparse distributed representations of the first HTM prediction data and system output data.

4. The computer implemented method of claim 1, wherein first system input data is input to the system at a first time and the second input data is input to the system at a second time after the first time.

5. The computer implemented method of claim 1, wherein the generating of the first HTM prediction data comprises applying a cortical learning algorithm to sparse distributed representations of the input dataset and system behavior data.

6. The computer implemented method of claim 1, wherein the generating of the second HTM prediction data comprises applying a cortical learning algorithm to sparse distributed representations of the first HTM prediction data and system output data.

7. The computer implemented method of claim 1, wherein the adjusting of the second system input data comprises calculating an adjustment amount using a Kalman estimator.

8. A computer program product comprising one or more computer readable storage media, and program instructions collectively stored on the one or more computer readable storage media, the program instructions executable by controller circuitry to cause the controller circuitry to perform operations comprising:

duplicating an input dataset being input to a model predictive control (MPC) module for input, along with a control signal generated by the MPC for a system, to a first Hierarchical Temporal Memory (HTM) network that simulates the system, the input dataset being associated with a system, the input dataset including first system input data that is input to the system, the input dataset including data associated with a plurality of dimensions of the system, and the input dataset including a characteristic dataset representative of a characteristic of the system;

generating system behavior data representative of a system behavior curve using the MPC module for the characteristic datasets;

generating first HTM prediction data from the input dataset and the system behavior data using the first HTM network comprising a plurality of regions each having a plurality of active and inactive nodes, the first HTM prediction data comprising predictions for respective dimensions of the system based on the active nodes for respective regions of the first HTM network;

generating second HTM prediction data from the first HTM prediction data and system output data using a second HTM network comprising a plurality of regions each having a plurality of active and inactive nodes, the second HTM prediction data comprising a distinction between the first HTM prediction and the system output data based on the active nodes for respective regions of the second HTM network;

determining that the distinction of the second HTM prediction data indicates an anomaly; and adjusting second system input data that is input to the system based on the anomaly.

9. The computer program product of claim 8, wherein the generating of the first HTM prediction data comprises generating sparse distributed representations of the input dataset and system behavior data.

10. The computer program product of claim 8, wherein the generating of the second HTM prediction data comprises generating sparse distributed representations of the first HTM prediction data and system output data.

11. The computer program product of claim 8, wherein first system input data is input to the system at a first time and the second input data is input to the system at a second time after the first time.

12. The computer program product of claim 8, wherein the generating of the first HTM prediction data comprises applying a cortical learning algorithm to sparse distributed representations of the input dataset and system behavior data.

13. The computer program product of claim 8, wherein the generating of the second HTM prediction data comprises applying a cortical learning algorithm to sparse distributed representations of the first HTM prediction data and system output data.

14. The computer program product of claim 8, wherein the adjusting of the second system input data comprises calculating an adjustment amount using a Kalman estimator.

15. The computer program product of claim 8, wherein the stored program instructions are stored in a computer readable storage device in a data processing system, and wherein the stored program instructions are transferred over a network from a remote data processing system.

16. The computer program product of claim 8, wherein the stored program instructions are stored in a computer readable storage device in a server data processing system, and wherein the stored program instructions are downloaded over a network to a remote data processing system for use in a computer readable storage device associated with the remote data processing system, further comprising:

program instructions to meter use of the computer usable code associated with the request; and program instructions to generate an invoice based on the metered use.

17. A computer system comprising a processor and one or more computer readable storage media, and program instructions collectively stored on the one or more computer readable storage media, the program instructions executable by the processor to cause the processor to perform operations comprising:
- duplicating an input dataset being input to a model predictive control (MPC) module for input, along with a control signal generated by the MPC for a system, to a first Hierarchical Temporal Memory (HTM) network that simulates the system, the input dataset being associated with a system, the input dataset including first system input data that is input to the system, the input dataset including data associated with a plurality of dimensions of the system, and the input dataset including a characteristic dataset representative of a characteristic of the system;
- generating system behavior data representative of a system behavior curve using the MPC module for the characteristic datasets;
- generating first HTM prediction data from the input dataset and the system behavior data using the first HTM network comprising a plurality of regions each having a plurality of active and inactive nodes, the first HTM prediction data comprising predictions for respective dimensions of the system based on the active nodes for respective regions of the first HTM network;
- generating second HTM prediction data from the first HTM prediction data and system output data using a second HTM network comprising a plurality of regions each having a plurality of active and inactive nodes, the second HTM prediction data comprising a distinction between the first HTM prediction and the system output data based on the active nodes for respective regions of the second HTM network;
- determining that the distinction of the second HTM prediction data indicates an anomaly; and
- adjusting second system input data that is input to the system based on the anomaly.

18. The computer system of claim 17, wherein the generating of the first HTM prediction data comprises applying a cortical learning algorithm to sparse distributed representations of the input dataset and system behavior data.

19. The computer system of claim 17, wherein the generating of the second HTM prediction data comprises applying a cortical learning algorithm to sparse distributed representations of the first HTM prediction data and system output data.

20. The computer system of claim 17, wherein the adjusting of the second system input data comprises calculating an adjustment amount using a Kalman estimator.

* * * * *